(12) United States Patent
Leman

(10) Patent No.: US 7,954,368 B2
(45) Date of Patent: Jun. 7, 2011

(54) TIRE PRESSURE MONITORING SYSTEM

(76) Inventor: Dirk Leman, Aarschot (BE)

(*) Notice: Subject to any disclaimer, the term of this patent is extended or adjusted under 35 U.S.C. 154(b) by 429 days.

(21) Appl. No.: 11/997,887

(22) PCT Filed: Sep. 15, 2006

(86) PCT No.: PCT/IB2006/002559
§ 371 (c)(1),
(2), (4) Date: Jan. 8, 2009

(87) PCT Pub. No.: WO2007/031862
PCT Pub. Date: Mar. 22, 2007

(65) Prior Publication Data
US 2009/0241643 A1   Oct. 1, 2009

(30) Foreign Application Priority Data

Sep. 16, 2005  (GB) .................................. 0518936.0

(51) Int. Cl.
*G01M 17/02* (2006.01)
(52) U.S. Cl. .......................................... 73/146; 340/442
(58) Field of Classification Search ........................ None
See application file for complete search history.

(56) References Cited

U.S. PATENT DOCUMENTS

| | | | |
|---|---|---|---|
| 6,329,925 B1* | 12/2001 | Skiver et al. | 340/815.4 |
| 6,420,975 B1* | 7/2002 | DeLine et al. | 340/815.4 |
| 6,428,172 B1* | 8/2002 | Hutzel et al. | 359/838 |

FOREIGN PATENT DOCUMENTS

| | | |
|---|---|---|
| EP | 1 319 531 A2 | 6/2003 |
| EP | 1 416 257 A2 | 5/2004 |
| JP | 2004 009923 A | 1/2004 |
| JP | 2005 145134 A | 6/2005 |
| WO | WO 01/70520 A | 9/2001 |

OTHER PUBLICATIONS

International Search Report for PCT/IB2006/002559 dated Jan. 31, 2007.

* cited by examiner

*Primary Examiner* — Lisa M Caputo
*Assistant Examiner* — Jermaine Jenkins
(74) *Attorney, Agent, or Firm* — Kilpatrick Townsend & Stockton LLP; Gerald T. Gray

(57) ABSTRACT

Tire pressure monitoring system for a vehicle includes sensor units mounted in each tire of the vehicle, each sensor unit being operable to output an RF signal indicative of the pressure in the tire in which it is mounted; a pair of communicator units for receiving signals from said sensor units, said pair of communicator units being provided at different locations on the vehicle; and a control unit connected to said communicator units wherein said control unit is operable to determine which sensor unit is associated with which tire by monitoring the strength of the RF signal received from each respective sensor unit by each communicator unit.

26 Claims, 2 Drawing Sheets

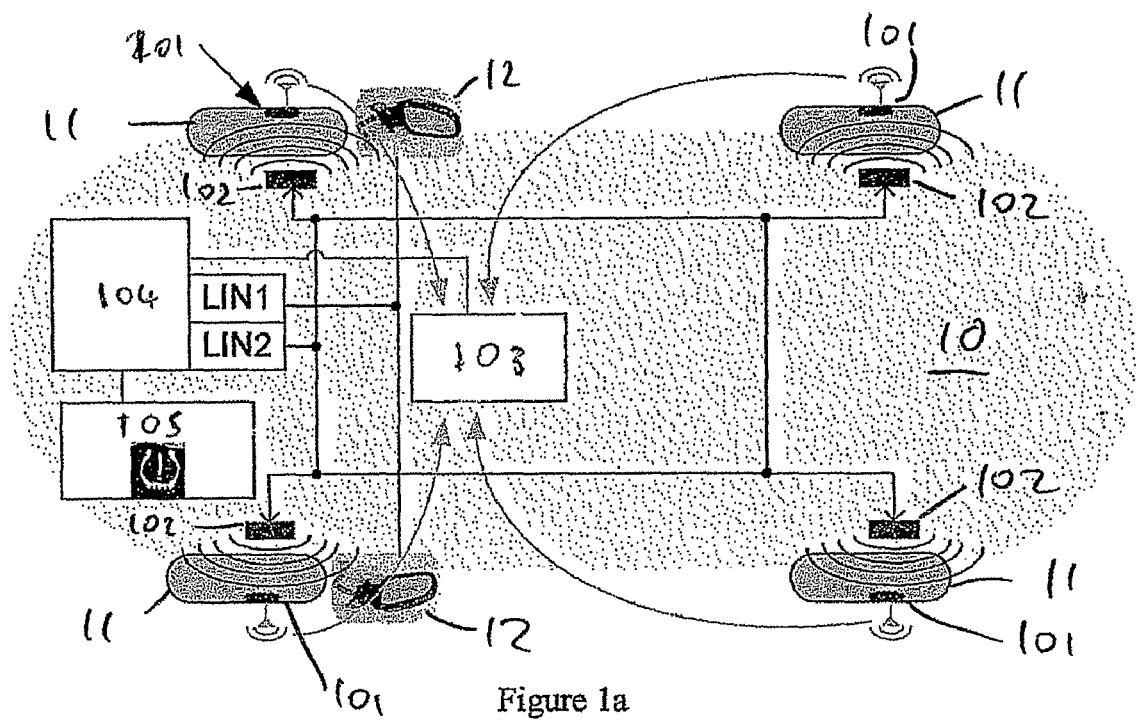
Figure 1a
Figure 1b
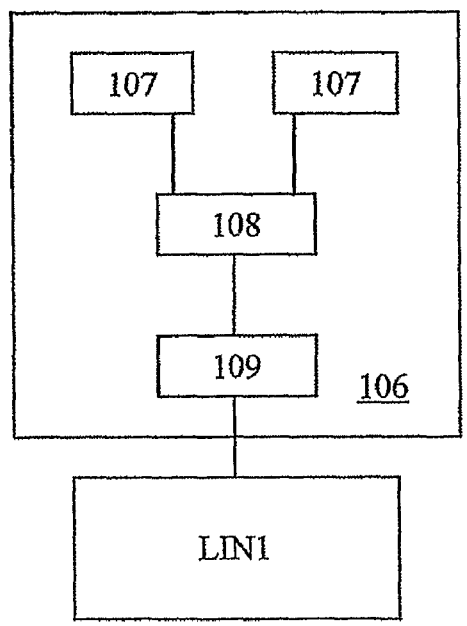

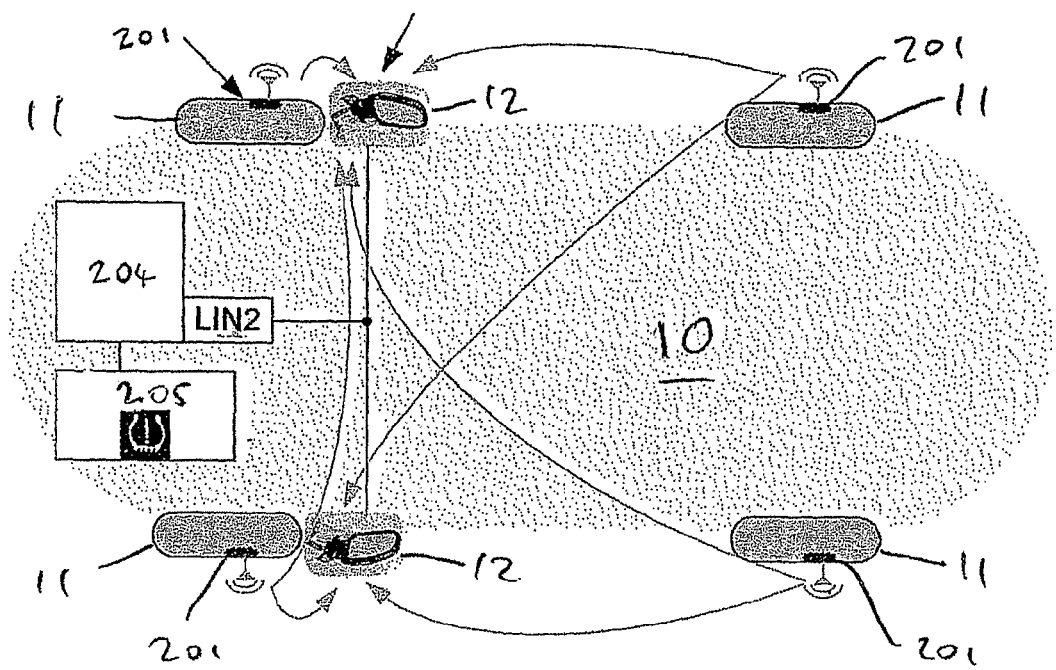
Figure 2a
Figure 2b
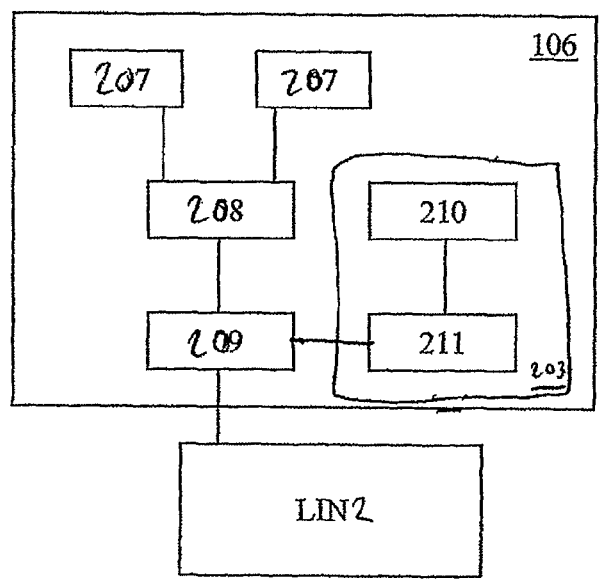

TIRE PRESSURE MONITORING SYSTEM

BACKGROUND

The present invention relates to a tire pressure monitoring system.

Many modern vehicles incorporate tire pressure monitoring systems (TPMS). Typically, these systems comprise: a plurality of individual pressure sensor units, one mounted in each tire, each sensor unit operable to output an RF signal indicative of the pressure in the tire and a central control unit for monitoring the output of said sensor units. Typically, such systems are implemented with dedicated transmit/receive units for each sensor unit provided in each wheel well and connected to the control unit via a dedicated network such as a LIN bus. These transmit/receive units allow the control unit to communicate with and identify each sensor unit and thus determine which sensor unit is associated with which tire.

Typically an additional central receiver unit is provided for receiving signals indicative of the pressure in each tire from each sensor unit. As a single centrally mounted receiver is used for receiving these signals relatively high strength signals must be output by the individual sensor units if they are to be clearly received by the central receiver unit. This results in a reduced effective lifetime for the individual sensor units as the battery in each unit is discharged more rapidly. Additionally, the fact that a dedicated network is provided for the transmit/receive units makes such TPMS relatively costly.

It is therefore an object of the present invention to provide a TPMS that overcomes or alleviates at least some of the above problems.

BRIEF SUMMARY

According to a first aspect of the present invention there is provided a tire pressure monitoring system (TPMS) for a vehicle comprising: sensor units mounted in each tire of the vehicle, each sensor unit being operable to output an RF signal indicative of the pressure in the tire in which it is mounted; a pair of communicator units for receiving signals from said sensor units, said pair of communicator units being provided at different locations on the vehicle; and a control unit connected to said communicator units wherein said control unit is operable to determine which sensor unit is associated with which tire by monitoring the strength of the RF signal received from each respective sensor unit by each communicator unit.

This provides a TPMS wherein the control unit is operable to determine which sensor unit is associated with which wheel without additional equipment or without being pre-programmed. Additionally, as this reduces the average distance of transmission from sensor unit to communicator unit, the sensor units can output lower power signals this leading to increased battery lifetime.

According to a second aspect of the present invention there is provided a tire pressure monitoring system (TPMS) for a vehicle comprising: sensor units mounted in each tire of the vehicle, each sensor unit being operable to output an RF signal indicative of the pressure in the tire in which it is mounted; a single communicator unit for receiving signals from said sensor units, said single communicator unit being positioned such that it is a different distance from each tire of the vehicle; and a control unit connected to said communicator unit wherein said control unit is operable to determine which sensor unit is associated with which tire by monitoring the strength of the RF signal received from each respective sensor unit by the communicator unit.

This provides a TPMS wherein the control unit is operable to determine which sensor unit is associated with which wheel without additional equipment or without being pre-programmed.

Preferably, each sensor unit is operable to transmit a signal of a substantially equal strength. As the or each communicator means is operable to determine the relative strengths of the signals received from each sensor unit, it is thus possible, by ranking the relative received signal strengths for each sensor unit, to determine the effective distance of each sensor unit from the or each communicator unit and thus the relative locations of each sensor unit.

Each sensor unit may be operable to sense other properties of the tire condition in addition to pressure. Each sensor unit may further be operable to output an RF signal indicative of the or each other property of the tire that is sensed. Such other properties may include temperature vibration, acceleration or similar. Each sensor unit may be operable to constantly or intermittently transmit RF signals. Preferably, said sensor units each transmit RF signals intermittently either at predetermined time intervals or after predetermined numbers of tire revolutions or fractions of tire revolutions.

Preferably, each sensor unit is provided with a unique identification code. Most preferably each said sensor unit transmits its unique identification code on each occasion that it transmits an RF signal. The sensor units may be operable to receive RF signals. Such received signals may be any or all of control signals, data signals or calibration signals.

The control unit may be connected to a display means. The display means may be operable to output an indication as to the condition of one or more tires in response to output received from the control unit. The display means may output an indication of tire condition at all times or may output an indication only when one or more tires are in an unsafe condition.

The or each communicator unit may be a receiver unit operable to receive RF signals or may be a transceiver unit operable to transmit as well as receive RF signals. The or each communicator unit may be connected to the control unit via a communication bus. Preferably such a communication bus conforms to the LIN protocol, a 'LIN bus'.

The or each communicator unit preferably comprises an RF antenna and means for determining the strength of the input signal. The means for determining the signal strength may be an analogue to digital converter. The or each communicator unit may be integrated in a single package.

The communicator units may be mounted in or on the housing of the side view mirrors of the vehicle: if there is a single communicator unit, it is mounted in or on the housing of a side view mirror of the vehicle; if there is a pair of communicator units, they are mounted in or on the housing of each side view mirror of the vehicle. In such embodiments, the communicator units may share a communication bus with an actuation controller unit operable to control actuator means for adjusting the alignment of the side view mirrors. In this manner the number of separate communication buses required in a vehicle can be reduced. This results in cost and complexity savings for vehicle manufacturers. Preferably, the communicator unit is integrated into the same package as the actuation controller unit. The actuator means may be motors such as servo motors. Preferably the package further includes a potentiometer for determining the position of the actuator means and a microcontroller for controlling the actuators in response to signals received from the control unit.

Preferably, where there is a pair of communicator units, each communicator unit is operable to receive signals from each of the sensor units.

According to a third aspect of the present invention there is provided a method of determining which tire a sensor unit is associated with in a TPMS according to the first aspect of the present invention or the second aspect of the present invention comprising the steps of: determining the relative strengths of RF signals received from each sensor unit; thereby determining the relative distances of each sensor unit from the or each communicator unit and thus determining the tire with which each sensor unit is associated.

The method of the third aspect of the present invention may incorporate any or all of the features described in relation to the first or second aspects of the invention as desired or as appropriate.

According to a fourth aspect of the present invention there is provided a communicator unit for use in the system and method of the previous aspects of the present invention, the unit comprising: an RF antenna for receiving an RF data signal; means for determining the strength of the received signal; and output means for outputting a signal to a control means indicative of the data in the received RF signal and the strength of the received RF signal The communicator unit of the fourth aspect of the present invention may incorporate any or all of the features described in relation to the first, second or third aspects of the present invention as desired or as appropriate.

BRIEF DESCRIPTION OF THE DRAWINGS

In order that the invention can be more clearly understood it is now described further below with reference to the accompanying drawings:

FIG. 1a is a schematic block diagram of a TPMS according to the prior art;

FIG. 1b shows a schematic block diagram of a mirror control system according to the prior art;

FIG. 2a is a schematic block diagram of a TPMS according to the present invention; and FIG. 2b shows a schematic block diagram of a mirror control system combined with a TPMS according to the present invention.

DETAILED DESCRIPTION

Referring now to FIG. 1, a known TPMS for a vehicle 10 comprises sensor units 101 mounted in each tire 11 of the vehicle 10 for monitoring the condition of the tires 11. A transmit/receive unit 102 is provided in the wheel well adjacent to each sensor unit 101 for communicating control signals between each sensor unit 101 and a control unit 104. Each sensor unit 101 is operable to output an RF signal indicative of the pressure in the tire 11. The output RF signal is received by a central receiver unit 103. The receiver unit 103 is usually mounted on the dashboard or on the roof of the vehicle and is connected to the control unit 104.

The control unit 104 is connected to a display unit 105 operable to process signals received from each sensor unit 101 and output and to cause the display unit 105 to output a suitable indication of the condition of each tire 101. In some embodiments, the display unit 105 may only output an indication if the condition of one or more of the tires is unsafe.

The control unit 104 is connected to each transmitter unit 102 via a LIN bus, LIN2. This enables the control unit 103 to send control signals to the sensor units 101. The receiver unit 103 may be connected directly to the control unit 104 or may be connected via LIN2.

In order that a user of the vehicle 10 may be informed as to which tire 11 in particular is unsafe, the control unit 104 must be able to determine which sensor unit 101 is associated with which tire 11. This can be achieved, if the location of each transmitter unit 102 is known by using each transmitter unit 102 in turn to transmit an identify signal to its associated sensor unit 101. Each sensor unit 101 can thus be associated with a particular tire 11.

FIG. 1 also shows that there may be other devices or systems controlled by the control unit 104. In this example, a side view mirror 12 position control system is shown.

Referring to FIG. 1b, the mirror position control system is implemented as a LIN slave 106 on a LIN bus, LIN1, linked to and controlled by control unit 104. The mirror control system comprises a pair of actuators 107, typically servo motors, controlled by a microcontroller 109. The actuators 107 are connected to the microcontroller 109 via a potentiometer 108. The potentiometer 108 enables the microcontroller 109 to detect the current position of each actuator 107. A plurality of other systems may also be provided, each system being connected to the control unit 104 by a different LIN bus.

FIG. 2a shows a TPMS 200 according to the present invention. As in FIG. 1, a sensor unit 201 is provided in each tire 11. A communicator unit 203 is mounted in each of the side view mirrors 12 of the vehicle 10. The communicator units 203 are connected to the same LIN bus, LIN2, as side view mirror position control system 206. Signals output by the sensor units 201 and received by the communicator units 203 are thus forwarded to the control unit 204 via LIN2. The communicator units 203 may in some embodiments additionally be operable to transmit control signals to the sensor units 201 under the control of the control unit 204. As above, the control unit 204 is connected to a display unit 205, which is operable to output an indication of the condition of the tires. The saving in cost of providing the transmitter units 102 is a considerable saving. Without the transmitter units 102, the sensor units 201 are operable in response to mechanical stimulus (such as a particular number of revolutions or fractions of revolutions) to transmit RF signals.

In order to identify which sensor unit 201 is associated with which tire, the communicator units 203 each comprise an RF antenna 210 operable to receive RF signals (and in some embodiment to transmit RF signals when required). The communicator units 203 additionally comprise an analogue to digital converter operable to measure the strength of received RF signals. Overall the communicator units 203 are operable to receive signals from each sensor unit 201 and forward the signals to the control unit 204 and forward an indication of the strength of the received signal to the control unit 204.

As is shown in FIG. 2b, the communicator unit 203 forms part of a LIN slave 206 incorporating the mirror control system. The mirror control system comprises a pair of actuators 207, a potentiometer 208 and a microcontroller 209 and is operable in the same manner as the mirror control system of FIG. 1b. To save space and/or weight, the communicator unit 203, potentiometer 208 and microcontroller 209 may be integrated in a single package.

By comparing the relative signal strengths of each sensor unit 201 as recorded by each communicator unit 203, the control unit 204 determines which sensor unit 201 is associated with which tire 11. This can be achieved as each sensor unit 201 is operable to transmit RF signals of a substantially similar strength. The strength of the signal received from each sensor unit 201 however declines with increasing separation between the sensor unit 201 and the communicator unit 203 and with the amount of conductive material between the sensor unit 201 and the communicator unit 203. Accordingly, the control unit 204 may determine the effective separation of each sensor unit from each communicator unit by received signal strength.

As the sensor unit would typically be mounted on the tire rim or adjacent to the tire valve, the distance between sensor unit 201 and communicator unit 203 varies as the tire 11 rotates. Accordingly the strength of the signal received fluctuates as the tire 11 rotates. This fact, in addition to the fact that the distance between side view mirror and the opposite front tire is substantially similar to the distance between a side view mirror and same side rear tire on many vehicles means that while it is possible for each sensor unit 201 to be identified using only one communicator means 203, it is preferable for the control unit 204 to compare signals received by both communicator means in order to identify sensor units 201. Typically, the control means 204 is adapted to compare the signals from both communicator means if two sensor means 201 appear to have similar signals strengths.

As is illustrated in table 1, the control unit can easily identify the adjacent front tire and the opposite rear tire to each communicator means 203 and can use the other communicator means as a cross-check.

TABLE 1

| | Left Mirror | | | | | Right Mirror | | | | |
|---|---|---|---|---|---|---|---|---|---|---|
| Tire | Max EqDis | Min EqDis | Min power | Max power | Posit. info | Max EqDis | Min EqDis | Min power | Max power | Posit. info |
| LF | 1 | 0.6 | 1 | 2.78 | Y | 2 | 1.6 | 0.25 | 0.39 | N |
| RF | 2 | 1.6 | 0.25 | 0.39 | N | 1 | 0.6 | 1 | 2.78 | Y |
| RB | 4 | 3.6 | 0.06 | 0.08 | Y | 2 | 1.6 | 0.25 | 0.39 | N |
| LB | 2 | 1.6 | 0.25 | 0.39 | N | 4 | 3.6 | 0.06 | 0.08 | Y |

An advantage of the present invention is that as the average distance between the sensor units 201 and the communicator units 203 is less than for the sensor units 101 and receiver unit 103 in the prior art, lower transmitted signal strengths can be used. This saving in output power for the sensor units 203 can extend their battery life and depth of discharge considerably. As an example, the present invention may permit the reduction in power of the output RF signals by up to 2 dBm. This can result in a drop in peak current drawn from the battery in the sensor unit of up to 3 mA. This increases the possible depth of discharge from 45% to 70% and thus will almost double the battery lifetime. Therefore the present invention allows either considerable battery lifetime improvement or considerable battery weight savings for a comparable lifetime.

Implementing a TPMS using the same LIN bus as the side view mirror control means that one less LIN bus needs to be provided, reducing the cost and complexity of the vehicle control systems. To further save space, the communicator means may be integrated as a single package with the mirror control system forming a single LIN slave on the LIN bus, as is illustrated in FIG. 2b.

Combining the TPMS with the mirror control can lead to loss of RF reception by the communicator means 203 during mirror movement. In practice, this is not a problem as the mirrors are usually only moved for a short period of time, typically when the vehicle 10 is stationary before setting off on a journey.

It is of course possible that the above system could be implemented using a pair of communicator units 203 provided at different locations and connected to the control unit 204 via a different network or connected to the control unit directly, if desired.

In an alternative embodiment, it is possible to implement this system using only a single communicator unit 203, if a clear difference in signal strength received from each sensor unit 201 can be guaranteed. Such a single communicator unit 203 could be provided in one side view mirror 12 and connected to the mirror control system as described hereinabove. Alternatively the single communicator unit 203 may be connected directly to the control unit 204 or connected to the control unit 204 via a different network. Similarly, the communicator unit 203 may be mounted in any other location where a clear difference in signal strength can be guaranteed.

In all of the above embodiments, the sensor units 201 are operable to detect the pressure in a tire 11 and output a signal indicative thereof. It is of course possible that the sensor units 201 may also be operable to sense other properties of the tire condition such as temperature, vibration and acceleration and output additional data signals indicative thereof.

It is of course to be understood that the invention is not to be restricted to the details of the above embodiments which have been described by way of example only.

What is claimed is:

1. A tire pressure monitoring system (TPMS) for a vehicle comprising:
    sensor units mounted in each tire of the vehicle, each sensor unit being operable to output an RF signal indicative of the pressure in the tire in which it is mounted;
    a pair of communicator units for receiving signals from said sensor units, said pair of communicator units being provided at different locations on the vehicle; and
    a control unit connected to said communicator units via a communication bus wherein said control unit is operable to determine which sensor unit is associated with which tire by monitoring the strength of the RF signal received from each respective sensor unit by each communicator unit, and wherein each communicator unit is mounted in or on the housing of each side view mirror of the vehicle and each communicator unit shares a communication bus with an actuation controller unit operable to control actuator means for adjusting the alignment of the side view mirror.

2. A tire pressure monitoring system (TPMS) for a vehicle comprising:
    sensor units mounted in each tire of the vehicle, each sensor unit being operable to output an RF signal indicative of the pressure in the tire in which it is mounted;
    a single communicator unit for receiving signals from said sensor units, said single communicator unit being positioned such that it is a different distance from each tire of the vehicle; and a control unit connected to said communicator unit via a communication bus wherein said control unit is operable to determine which sensor unit is associated with which tire by monitoring the strength of the RF signal received from each respective sensor unit by the communicator unit, and wherein the communicator unit is mounted in or on the housing of a side view mirror of the vehicle and the communicator unit shares a communication bus with an actuation controller unit operable to control actuator means for adjusting the alignment of the side view mirror.

3. A TPMS as claimed in claim 1 or 2 wherein each sensor unit is operable to sense other properties of the tire condition in addition to pressure.

4. A TPMS as claimed in claim 1 or 2 wherein each sensor unit is operable to constantly transmit RF signals.

5. A TPMS as claimed in claim 1 or 2 wherein each sensor unit is operable to intermittently transmit RF signals.

6. A TPMS as claimed in claim 5 wherein said sensor units each transmit RF signals at predetermined time intervals.

7. A TPMS as claimed in claim 5 wherein said sensor units each transmit RF signals after predetermined numbers of tire revolutions or fractions of tire revolutions.

8. A TPMS as claimed in claim 1 or 2 wherein each sensor unit is provided with a unique identification code and each said sensor unit transmits its unique identification code on each occasion that it transmits an RF signal.

9. A TPMS as claimed in claim 1 or 2 wherein each sensor unit is operable to receive RF signals.

10. A TPMS as claimed in claim 9 wherein said received signals are control signals, data signals or calibration signals.

11. A TPMS as claimed in claim 1 or 2 wherein the control unit is connected to a display means.

12. A TPMS as claimed in claim 11 wherein the display means is operable to output an indication as to the condition of one or more tires in response to output received from the control unit.

13. A TPMS as claimed in claim 11 wherein the display means outputs an indication of tire condition at all times.

14. A TPMS as claimed in claim 11 wherein the display means outputs an indication of tire condition only when one or more tires are in an unsafe condition.

15. A TPMS as claimed in any claim 1 or 2 wherein a communicator unit is a receiver unit operable to receive RF signals.

16. A TPMS as claimed in claim 1 or 2 wherein a communicator unit is a transceiver unit operable to transmit as well as receive RF signals.

17. A TPMS as claimed in claim 1 or 2 wherein a communicator unit comprises an RF antenna and means for determining the strength of the received signal.

18. A TPMS as claimed in claim 1 or 2 wherein the means for determining the signal strength includes an analogue to digital converter.

19. A TPMS as claimed in claim 1 or 2 wherein a communicator unit is integrated in a single package.

20. A TPMS as claimed in claim 1 or 2 wherein the communicator unit is integrated into the same package as the actuation controller unit.

21. A TPMS as claimed in claim 1 or 2 wherein the actuator means include servo motors.

22. A TPMS as claimed in claim 20 wherein the package includes a potentiometer for determining the position of the actuator means and a microcontroller for controlling the actuators in response to signals received from the control unit.

23. A TPMS as claimed in claim 1 or 2 wherein each sensor unit is operable to transmit a signal of a substantially equal strength.

24. A communicator unit for use in the system of claim 1 or 2 comprising:
an RF antenna for receiving an RF data signal;
means for determining the strength of the received signal; and
output means for outputting a signal to a control means via a communication bus indicative of the data in the received RF signal and the strength of the received RF signal wherein the communicator unit is adapted to be mounted in or on the housing of a side view mirror of the vehicle and is adapted to share a communication bus with an actuation controller unit operable to control actuator means for adjusting the alignment of the side view mirror.

25. A communicator unit as claimed in claim 24 wherein the means for determining the signal strength includes an analogue to digital converter.

26. A communicator unit as claimed in claim 24 wherein the communicator unit is integrated in a single package.

* * * * *